(12) United States Patent
Rodriguez Bravo et al.

(10) Patent No.: US 11,575,751 B2
(45) Date of Patent: Feb. 7, 2023

(54) DYNAMIC CREATION OF SENSOR AREA NETWORKS BASED ON GEOFENCED IOT DEVICES

(71) Applicant: INTERNATIONAL BUSINESS MACHINES CORPORATION, Armonk, NY (US)

(72) Inventors: Cesar Augusto Rodriguez Bravo, Alajuela (CR); Lisa Seacat DeLuca, Bozeman, MT (US); Sarbajit K. Rakshit, Kolkata (IN); David Jaramillo, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 165 days.

(21) Appl. No.: 17/120,515

(22) Filed: Dec. 14, 2020

(65) Prior Publication Data

US 2022/0189646 A1 Jun. 16, 2022

(51) Int. Cl.
*H04W 52/02* (2009.01)
*H04W 56/00* (2009.01)
(Continued)

(52) U.S. Cl.
CPC .............. *H04L 67/12* (2013.01); *G16Y 30/10* (2020.01); *G16Y 40/10* (2020.01); *H04W 4/021* (2013.01)

(58) Field of Classification Search
CPC ......... H04L 67/12; H04L 67/04; G16Y 40/10; G16Y 30/10; H04W 4/021;
(Continued)

(56) References Cited

U.S. PATENT DOCUMENTS 8,941,489 B2 1/2015 Sheshadri
9,054,961 B1 6/2015 Kim
(Continued)

FOREIGN PATENT DOCUMENTS

CA 2893934 C 11/2018

OTHER PUBLICATIONS

Pultar, "Industrial IoT + Geofencing for Monitoring Mobile Assets with Sensors", Medium, Nov. 26, 2018, 3 pages, https://medium.com/@edwardpultar/industrial-iot-geofencing-for-monitoring-mobile-assets-with-ensors-1e9e1424ae43.
(Continued)

*Primary Examiner* — Chris Parry
*Assistant Examiner* — Hassan A Khan
(74) *Attorney, Agent, or Firm* — Anthony M. Pallone

(57) ABSTRACT

An embodiment of the invention may include a method, computer program product and system for managing a sensor area network. An embodiment may include, in response to receiving a geofence trigger event from an Internet of Things device, determining whether to add the Internet of Things device to a sensor area network of Internet of Things devices within a geofence area based on a validation technique. An embodiment may include, in response to determining to add the Internet of Things device, updating the sensor area network with information associated with the Internet of Things device. An embodiment may include enabling sharing of information within the sensor area network between member devices of the sensor area network and the Internet of Things device.

17 Claims, 6 Drawing Sheets

(51) Int. Cl.
  *H04L 67/12* (2022.01)
  *G16Y 30/10* (2020.01)
  *H04W 4/021* (2018.01)
  *G16Y 40/10* (2020.01)

(58) Field of Classification Search
  CPC ......... H04W 52/0219; H04W 52/0216; H04W 56/00; H04W 16/14; H04W 74/00; H04W 84/18; H04W 72/02; H04W 74/04; Y02B 60/50
  See application file for complete search history.

(56) References Cited

U.S. PATENT DOCUMENTS

| | | | | |
|---|---|---|---|---|
| 9,210,534 | B1* | 12/2015 | Matthieu | H04L 51/066 |
| 2003/0152041 | A1* | 8/2003 | Herrmann | H04L 12/2803 370/310 |
| 2004/0100917 | A1* | 5/2004 | Perkins | H04W 84/20 370/310.2 |
| 2006/0030333 | A1* | 2/2006 | Ward | H04W 4/025 455/456.1 |
| 2008/0084304 | A1* | 4/2008 | Yarvis | G06K 19/0717 340/539.22 |
| 2008/0253327 | A1* | 10/2008 | Kohvakka | H04W 16/14 370/330 |
| 2008/0259919 | A1* | 10/2008 | Monga | H04L 43/12 370/389 |
| 2009/0138507 | A1* | 5/2009 | Burckart | G11B 27/105 |
| 2010/0017126 | A1* | 1/2010 | Holcman | G08B 21/0261 701/300 |
| 2013/0099977 | A1* | 4/2013 | Sheshadri | H04W 4/022 342/450 |
| 2013/0128786 | A1* | 5/2013 | Sultan | H04W 52/0238 370/311 |
| 2013/0182615 | A1* | 7/2013 | Sun | H04W 52/0219 370/255 |
| 2014/0273859 | A1* | 9/2014 | Luna | H04M 1/72454 455/41.3 |
| 2015/0103694 | A1* | 4/2015 | Xu | H04W 52/0219 370/254 |
| 2015/0148077 | A1* | 5/2015 | Jelle | H04W 4/022 455/456.3 |
| 2015/0372832 | A1* | 12/2015 | Kortz | G05B 13/04 700/278 |
| 2016/0072806 | A1* | 3/2016 | Kim | H04W 12/50 726/5 |
| 2016/0135241 | A1* | 5/2016 | Gujral | H04W 76/14 370/328 |
| 2017/0099353 | A1* | 4/2017 | Arora | H04W 4/70 |
| 2017/0289806 | A1* | 10/2017 | Girdhar | H04W 12/64 |
| 2017/0366977 | A1* | 12/2017 | Girdhar | H04W 12/08 |
| 2018/0103080 | A1* | 4/2018 | Girish | H04L 65/80 |
| 2018/0183685 | A1* | 6/2018 | Cook | H04W 4/08 |
| 2018/0316555 | A1* | 11/2018 | Salgueiro | H04L 41/0816 |
| 2019/0132656 | A1* | 5/2019 | Struhsaker | H04L 67/12 |
| 2019/0155659 | A1* | 5/2019 | Rodriguez Bravo | H04L 67/75 |
| 2019/0268310 | A1* | 8/2019 | Guberman | H04L 9/0819 |
| 2019/0297078 | A1* | 9/2019 | Davis, III | H04L 63/0876 |
| 2019/0349254 | A1* | 11/2019 | Nolan | H04W 12/106 |
| 2020/0045522 | A1* | 2/2020 | Horton | H04L 67/1097 |
| 2020/0104509 | A1* | 4/2020 | Furuichi | H04L 63/1433 |
| 2020/0174846 | A1* | 6/2020 | Rodriguez Bravo | H04L 67/75 |
| 2020/0177590 | A1* | 6/2020 | Levy | H04W 12/10 |
| 2020/0259896 | A1* | 8/2020 | Sachs | G07C 9/00174 |
| 2020/0348662 | A1* | 11/2020 | Cella | G06N 3/088 |
| 2020/0374205 | A1* | 11/2020 | Sharma | H04L 67/12 |
| 2020/0389758 | A1* | 12/2020 | Zises | H04W 4/021 |
| 2021/0126814 | A1* | 4/2021 | Stamatakis | H04L 12/2825 |
| 2021/0211509 | A1* | 7/2021 | Ly | H04L 67/51 |
| 2021/0215787 | A1* | 7/2021 | Anvari | G01S 13/765 |
| 2021/0266326 | A1* | 8/2021 | Chen | H04L 67/52 |
| 2022/0150324 | A1* | 5/2022 | Seed | H04W 4/70 |
| 2022/0189646 | A1* | 6/2022 | Rodriguez Bravo | H04W 4/38 |

OTHER PUBLICATIONS

Zafari, "Micro-Location for Internet of Things Equipped Smart Buildings" 2015, pp. 1-17, http://www.ieee.org/publications_standards/publications/rights/index.html.

Burns, "How To Solve For Geofencing In The Low Power IoT", Medium, Jan. 13, 2019, 5 pages, https://medium.com/@patburns/how-to-solve-for-geofencing-in-the-low-power-iot-94567de29eaf.

Kerravala, "To Secure industrial IoT, use segmentation instead of firewalls", Network World, Sep. 11, 2019, 6 pages, https://www.networkworld.com/article/3437956/to-secure-industrial-iot-use-segmentation-instead-of-firewalls.html.

Mell et al., "The NIST Definition of Cloud Computing", Recommendations of the National Institute of Standards and Technology, NIST Special Publication 800-145, Sep. 2011, 7 pages.

IoT, "Geofencing—IoT Now—How to run an IoT enabled business", printed Jan. 16, 2020, 8 pages, https://www.iot-now.com/tag/geofencing/.

IBM, "Geofencing with IoT, IBM Geospatial Analytics and Mapbox", Big Data and Analytics, IoT, developerWorks Recipes, published Dec. 23, 2016/Updated on Feb. 8, 2019, 14 pages.

* cited by examiner

DYNAMIC CREATION OF SENSOR AREA NETWORKS BASED ON GEOFENCED IOT DEVICES

BACKGROUND

Embodiments of the present invention relate generally to the field of networked computing devices, more specifically to the Internet of Things (IoT), and to creating a senor area network for IoT devices using geofencing techniques.

The Internet of Things describes the network of physical objects (e.g., electronic devices) that are embedded with sensors, software, and other technologies for the purpose of connecting and exchanging data with other devices and systems over the Internet. Traditional fields of embedded systems, wireless sensor networks, control systems, automation (including home and building automation), and others all contribute to enabling the Internet of Things. In the consumer market, IoT technology is most synonymous with products pertaining to the concept of a "smart home" (i.e., a home equipped with electronic devices that can be controlled remotely), which includes devices and appliances (e.g., lighting fixtures, thermostats, home security systems and cameras, TVs, refrigerators, ranges, etc.) that support one or more common ecosystems, and can be controlled via devices associated with that ecosystem, such as smartphones and computers.

BRIEF SUMMARY

An embodiment of the invention may include a method, computer program product and system for managing a sensor area network. An embodiment may include, in response to receiving a geofence trigger event from an Internet of Things device, determining whether to add the Internet of Things device to a sensor area network of Internet of Things devices within a geofence area based on a validation technique. An embodiment may include, in response to determining to add the Internet of Things device, updating the sensor area network with information associated with the Internet of Things device. An embodiment may include enabling sharing of information within the sensor area network between member devices of the sensor area network and the Internet of Things device.

DETAILED DESCRIPTION

Figure 1:
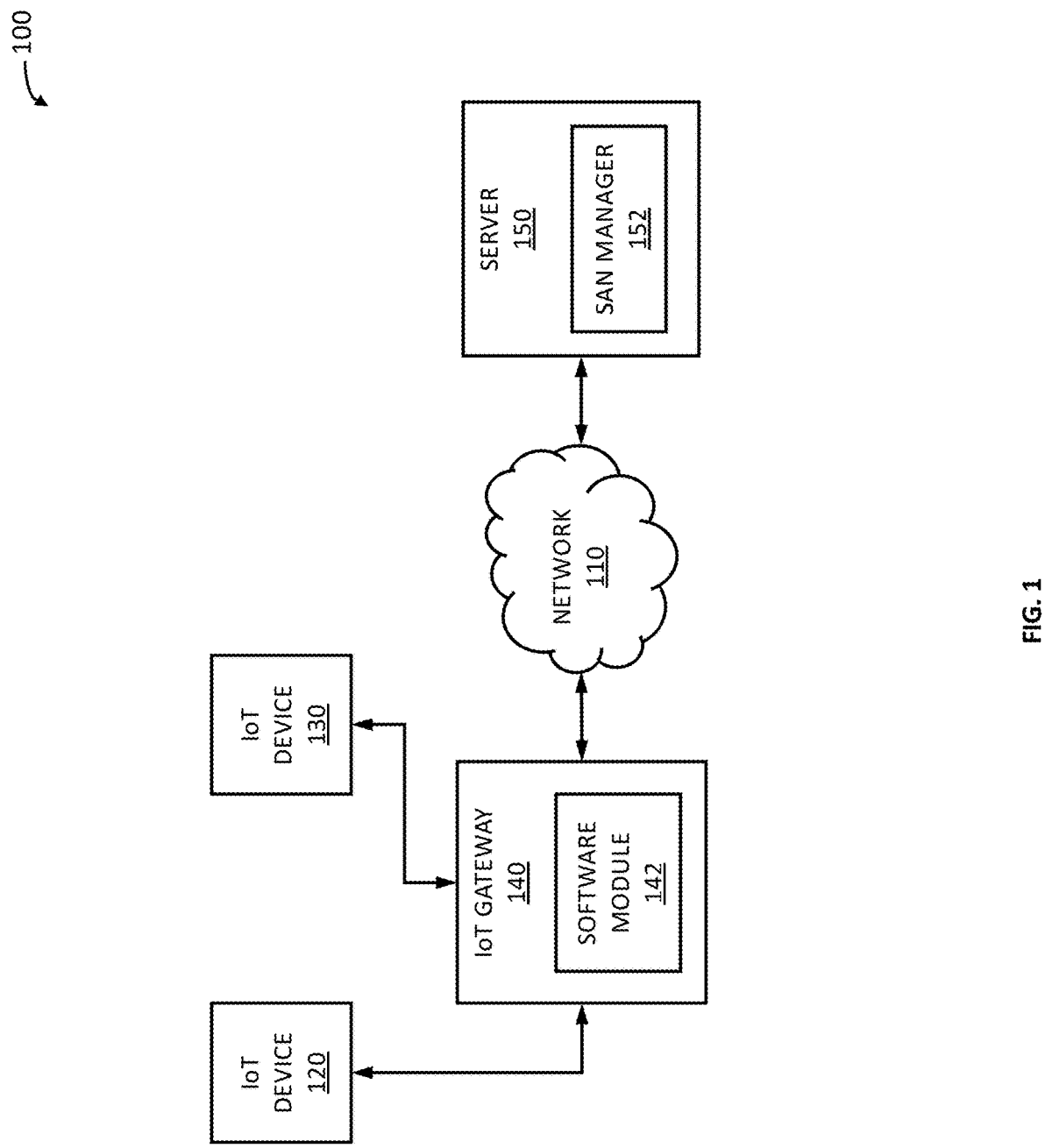
FIG. 1 is a block diagram illustrating an Internet of Things (IoT) environment, in accordance with an embodiment of the present invention.

Embodiments of the present invention propose a method and system by which an Internet of Things (IoT) geofencing area will be created based on the location of IoT devices within a designated area in order to create a sensor area network which restricts access to the geofence area network (GAN) based on the geofence dwell action. The sensor area network enables the sharing of capabilities and data between the members of the geofenced IoT Network.

A geo-fence is a virtual perimeter for a real-world geographic area. A geofence may be dynamically generated (i.e., as in a radius around a point location) or a geofence may include a predefined set of boundaries (such as school zones or neighborhood boundaries). Geofencing areas may also be created dynamically based on context (i.e., a need or desired capability), and they may be static or move with time.

Today, widespread use of geofencing is a common practice within residential and commercial areas. In addition, wireless IoT devices/sensors can spread across a geofenced area and essentially create a sensor area network with different sensors being used for different purposes and having different capabilities. In any sensor area network, each sensor is identified uniquely based on attributes such as, but not limited to, their relative position, data type, and/or ID. While the position of these devices/sensors may be static within the sensor area network, these devices/sensors can also move in and out of, as well as within, the sensor area network.

While current IoT networks are categorized based on device type, embodiments of the present invention are based on IoT device location. Embodiments of the present invention propose the creation of a sensor area network using geofencing techniques applied to a given set of IoT devices to identify the members of the sensor area network and then enable the sharing of information or resources (sensors, power, etc) between the geofenced IoT member devices.

Geofencing combines awareness of a device's current location and awareness of the device's proximity to a location(s) of interest. To mark a location as a location of interest, a geofence implementation may specify the latitude and longitude of the location. To adjust the proximity for the location of interest, the geofence implementation may add a radius around the marked location. Thus, latitude, longitude, and radius define a geofence which creates a circular area, or fence, around the location of interest. A geofence may access software services (e.g., location service APIs) which utilize geographic data and information to provide location services/information. For example, location services may send a geofence implementation alerts to entrance and exit events. Additionally, a duration within the geofence area for an IoT device to wait, or dwell, can be specified before triggering an alert to an event (e.g., entry, exit).

As mentioned above, the use of a geofence is called geofencing, and one example usage involves a location aware IoT device entering or exiting a geofence. When a location aware IoT device performs the activity of entering or exiting a geofenced area, the device may cause a geofence trigger event. In embodiments of the invention, such an activity (e.g., entering or exiting a geofence area) may trigger an alert of a geofence trigger event to be sent to a geofencing implementation management module. In embodiments of the present invention, when an IoT device enters a geofenced area, thereby causing a geofence trigger event, a validation technique may be implemented to determine the addition of the entering IoT device to the sensor area network or the rejection of the entering IoT device by the sensor area network. The implemented validation technique may include a plurality of executable security actions. In embodiments of the present invention, security actions to determine the addition of the entering IoT device to the sensor area network include performing a handshake operation based on one or more of the following: device hardware characteristics (e.g., device ID, model manufacturer, serial #); device type or category (e.g., surveillance device, controlling device, monitoring device, etc); device outputs (e.g., data type, data content, etc); device features and capabilities based on sensors of the device; a private key preloaded on the device; and/or device signature comparison to previously authorized devices or member devices.

In embodiments of the invention, once the handshake operation is successfully performed, the IoT device will become part of the geofenced sensor area network and will automatically share information of the IoT device (e.g. any data collected by the device) with other member IoT devices of the sensor area network. For example, once an IoT enabled school bus (e.g., a school bus equipped with an IoT device/sensor) arrives to a location of interest, such as a school, implementing a sensor area network in accordance with embodiments of the invention, the IoT sensor of the school bus can start sharing relevant information, such as, time of arrival and/or information about one or more onboard students (e.g., names, pick up times, pick up location, destination location, drop off time, etc) with member IoT devices of the sensor area network implemented at the school. Additionally, the IoT sensor of the school bus can also begin to receive information (e.g., a roster of boarding students with attributes such as destination locations) from member IoT devices of the sensor area network implemented at the school. Such an exchange of information/data may be performed among a plurality of member IoT devices of a sensor area network.

Embodiments of the invention allow for the automatic creation of a sensor area network based on a user designated purpose of operation for the sensor area network. In embodiments of the invention, based on one or more contextual needs (e.g., a desired capability, a designated purpose) of a sensor area network, IoT devices within an existing, or proposed, IoT sensor area network can submit a request to another IoT device within the geofenced area to join, or create, a given sensor area network in order to meet the contextual need (e.g., provide the desired capability, enable the sensor area network to operate according to the designated purpose) of the sensor area network. For example, if a sensor of a particular type is not responding, or is not present, within a given sensor area network, a sensor area network management module can request another IoT device of that particular type to join the sensor area network and provide the missing capability, thus creating a dynamic self-autonomous sensor area network. As an illustration, consider a scenario in which an IoT enabled home, which implements a sensor area network in accordance with embodiments of the invention, benefits from the addition of an IoT enabled car to the sensor area network. In such a scenario, IoT sensors of the car (e.g., radar sensors, laser sensors, ultrasonic sensors, GPS sensors, video cameras) and their associated capabilities may enhance and/or expand upon the capabilities of the sensor area network implanted at the IoT enabled home.

Additionally, in other embodiments of the invention, the sensor area network created using geofencing techniques may be represented in three-dimensional (3D) space. As such, the 3D position of different IoT devices/sensors within the sensor area network will be identified and the sensor area network will be presented as three dimensional. In the context of a building, this means that the coverage of the geofenced sensor area network is not linear, rather, it will be comprised by the coverage of the geofenced area so as to reach encompassed cars, lower and upper floors of a building, drones, etc.

Additionally, in other embodiments of the invention, the area or boundary of an IoT geofencing area will be based on the capabilities of each IoT device/sensor contained therein and how those IoT devices/sensors gather and/or share data from adjacent IoT devices/sensors present in the sensor area network of the IoT geofencing area. In another embodiment, a given sensor area network may comprise the sum of a plurality of IoT devices/sensors available within the IoT geofenced area. In other embodiments of the invention, the area or boundary of an IoT geofencing area may be a context aware sensor geofencing boundary. For example, in an assembly line scenario, different sets of workers may be performing different assembly activities using IoT devices/sensors, as such, a same set of activity being performed can be identified and geofencing can be created among the workers who are performing that same set of activities. Moreover, based on the context, two or more sensor geofencing areas can be merged or split. As another example, consider the scenario in which there is a building having a corresponding geofenced area and a smart car enters that geofenced area, depending on the sensors or capabilities offered by the smart car, that smart car can become part of the geofenced sensor area network (for example to leverage the Lidar or cameras of the smart car). On the other hand, if the smart car does not offer any sensor, the smart car will become the boundary of reach of the geofenced sensor area network.

Additionally, in other embodiments of the invention, if an IoT device/sensor is a member of a first geofenced sensor area network and attempts to join a second geofenced sensor area network, the second geofenced sensor area network may perform a request to acquire permission from the first geofenced sensor area network. Such an action would help with the location of lost IoT devices/sensors within the geofenced area and provide additional security for preventing the reading data off of an IoT device/sensor when access is not granted.

Additionally, in other embodiments of the invention, upon exit of an IoT device/sensor from the geofenced area, the IoT device/sensor, regardless of sensor area network connection, may choose to switch to an edge-state in which data is still calculated offline but never attempted to be shared until the IoT device/sensor returns to the geofenced area.

Embodiments of the present invention will now be described in detail with reference to the accompanying Figures.

FIG. 1 is a functional block diagram illustrating Internet of Things (IoT) Environment 100, in accordance with an embodiment of the present invention. IoT Environment 100 is a network of IoT devices, computers, and other devices in which the illustrative embodiments may be implemented. In an example embodiment, IoT Environment 100 may include IoT device 120, IoT device 130, IoT gateway 140, and server 150, all interconnected via network 110.

In various embodiments, network 110 is a communication channel capable of transferring data between connected devices. In an example embodiment, network 110 may be the Internet, representing a worldwide collection of networks and gateways to support communications between devices connected to the Internet. Moreover, network 110 may include, for example, wired, wireless, or fiber optic connections which may be implemented as an intranet network, a local area network (LAN), a wide area network (WAN), or any combination thereof. In further embodiments, network 110 may be a Bluetooth network, a WiFi network, or a combination thereof. In general, network 110 can be any combination of connections and protocols that will support an Internet of Things environment and may support communications between IoT device 120, IoT device 130, IoT gateway 140, and server 150.

In an example embodiment, IoT device 120 and IoT device 130 may be any physical device or piece of hardware equipped with one or more sensors and capable of transmitting data over the Internet. Types of IoT devices (e.g., IoT devices 120 & 130) include wireless sensors (e.g., temperature sensors, motion sensors, chemical sensors, particle sensors, light sensors, electrical sensors, etc.), software, actuators, and computer devices. IoT devices (e.g., IoT devices 120 & 130) can be imbedded into a plethora of objects including, but not limited to, mobile devices, industrial equipment, home appliances, thermostats, light bulbs, televisions, cameras, environmental sensors, medical devices, wearable computing devices, and vehicles. IoT devices (e.g., IoT devices 120 &130) may transmit data over the Internet and/or via other technologies such as radio frequency, a Bluetooth network, a WiFi network, or a combination thereof. In an example embodiment, the one or more sensors of IoT devices 120 and 130 collects data on observable occurrences or changes in a physical environment and/or of a person. Furthermore, in an example embodiment, IoT devices 120 and 130 transmit collected data to another device, such as IoT gateway 140 (discussed below). While IoT environment 100 is depicted as having two IoT devices (i.e., IoT devices 120 and IoT device 130), in other embodiments, IoT environment 100 may include a cluster or plurality of IoT devices 120 and 130, working together or working separately.

In an example embodiment, IoT gateway 140 may include software module 142. IoT gateway 140 may be a laptop computer, a notebook, a tablet computer, a netbook computer, a personal computer (PC), a desktop computer, a personal digital assistant (PDA), a smart phone, or any other electronic device or computing system capable of sending, and receiving data to and from other computing devices such as IoT device 120, IoT device 130, and server 150, via network 110, and capable of supporting the functionality required of embodiments of the invention (e.g., facilitating the communication among IoT devices 120 & 130 and between server 150). For example, IoT gateway 140 may support a communication link (e.g., wired, wireless, direct, via a LAN, via the network 110, etc.) between IoT device 120, IoT device 130, and server 150. Data sent from IoT gateway 140 may include data collected from and/or observed by IoT device 120 and IoT device 130. Data received by IoT gateway 140 may include data sent, via network 110, from server 150 (described below) and data received from IoT device 120 and IoT device 130. In an example embodiment, IoT gateway 140 may also serve to pre-process data received from IoT device 120 and IoT device 130. While IoT gateway 140 is shown as a single device, IoT gateway 140 may represent a plurality of computing devices. IoT gateway 140 may be described, generally, with respect to FIG. 4 below. In an example embodiment, IoT gateway 140 may send, via network 110, data captured by IoT device 120 and IoT device 130 to sensor area network manager 152 (described below) located on server 150. In an example embodiment, IoT gateway 140 may receive data from sensor area network manager 152 located on server 150.

In an example embodiment, software module 142 may be a program, or subroutine contained in a program, that may operate to execute, in part, the functions of IoT gateway 140 described above. In an example embodiment, software module 142 may facilitate the communication between IoT device 120 and IoT device 130, in addition to the communication between these devices and server 150. In embodiments of the invention, software module 142 may translate potentially different protocols utilized by IoT device 120 and IoT device 130 into a standard protocol and filtering out unnecessary data gathered by the devices. In embodiments of the invention, software module 142 may processes data received from IoT device 120 and IoT device 130. Such processing may include actions such as: data caching, buffering and streaming; data pre-processing, cleansing, filtering and optimization; data aggregation; maintaining short term data history, managing user access and network security features; performing IoT device configuration management; and performing system diagnostics.

In an example embodiment, server 150 may include sensor area network manager 152. Server 150 may be a desktop computer, a notebook, a laptop computer, a blade server, a networked computer appliance, a virtual device, or any other networked electronic device or computing system capable of receiving and sending data from and to other computing devices such as IoT gateway 140, via network 110, and capable of supporting the functionality required of embodiments of the invention. In embodiments of the invention, server 150 may host an IoT device sensor area network management application (e.g., sensor area network manager 152) for management of a sensor area network of IoT Environment 100. In an example embodiment, server 150 may function to process data received from IoT gateway 140, via network 110. While server 150 is shown as a single device, in other embodiments, server 150 may represent a cluster or plurality of servers, working together or working separately. Server 150 may be described generally with respect to FIG. 4 below.

In an example embodiment, sensor area network (SAN) manager 152 may be a program, or subroutine contained in a program, that may create a sensor area network using geofencing techniques which are applied to a given set of IoT devices in order to identify members of a sensor area network and enable automatic sharing, between the geofenced IoT member devices, of information and/or resources (e.g., sensor capability, power, etc.) of members of the sensor area network. In an example embodiment, SAN manager 152 may apply geofencing techniques to IoT device 120 and IoT device 130 in order to identify these devices and create a sensor area network with these devices as members. Furthermore, in an example embodiment, SAN manager 152 may enable the automatic sharing of information between IoT device 120, IoT device 130, and IoT gateway 140. While IoT environment 100 is depicted as having two IoT devices (i.e., IoT devices 120 and IoT device 130), in other embodiments, IoT environment 100 may include a cluster or plurality of sensor area network member IoT devices 120 and 130, working together or working separately, and SAN manager 152 may enable the automatic sharing of information among them.

Figure 2:
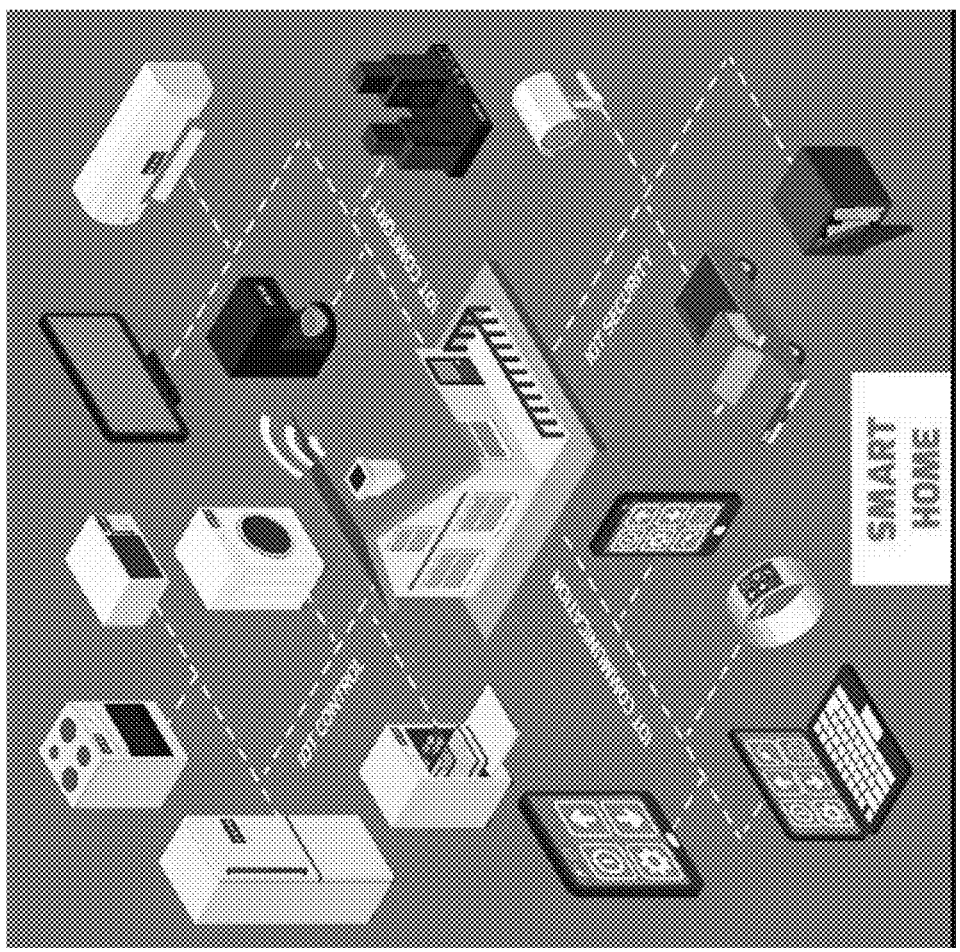
FIG. 2 depicts an example IoT environment implemented using one or more components and features of the IoT environment of FIG. 1.

FIG. 2 depicts an example IoT environment implemented using one or more components and features of the IoT environment of FIG. 1. FIG. 2 depicts a smart home connected to plurality of IoT devices for enabling various aspects of home automation such as computing device communications, home appliance control, environmental comfort control (e.g., temperature control), occupancy aware control, and home security. The plurality of IoT devices depicted in FIG. 2 may be connected to a gateway (not shown), such as IoT gateway 140, which is connected to a server (not shown), such as server 150, via a network (not shown), such as network 110.

Figure 3:
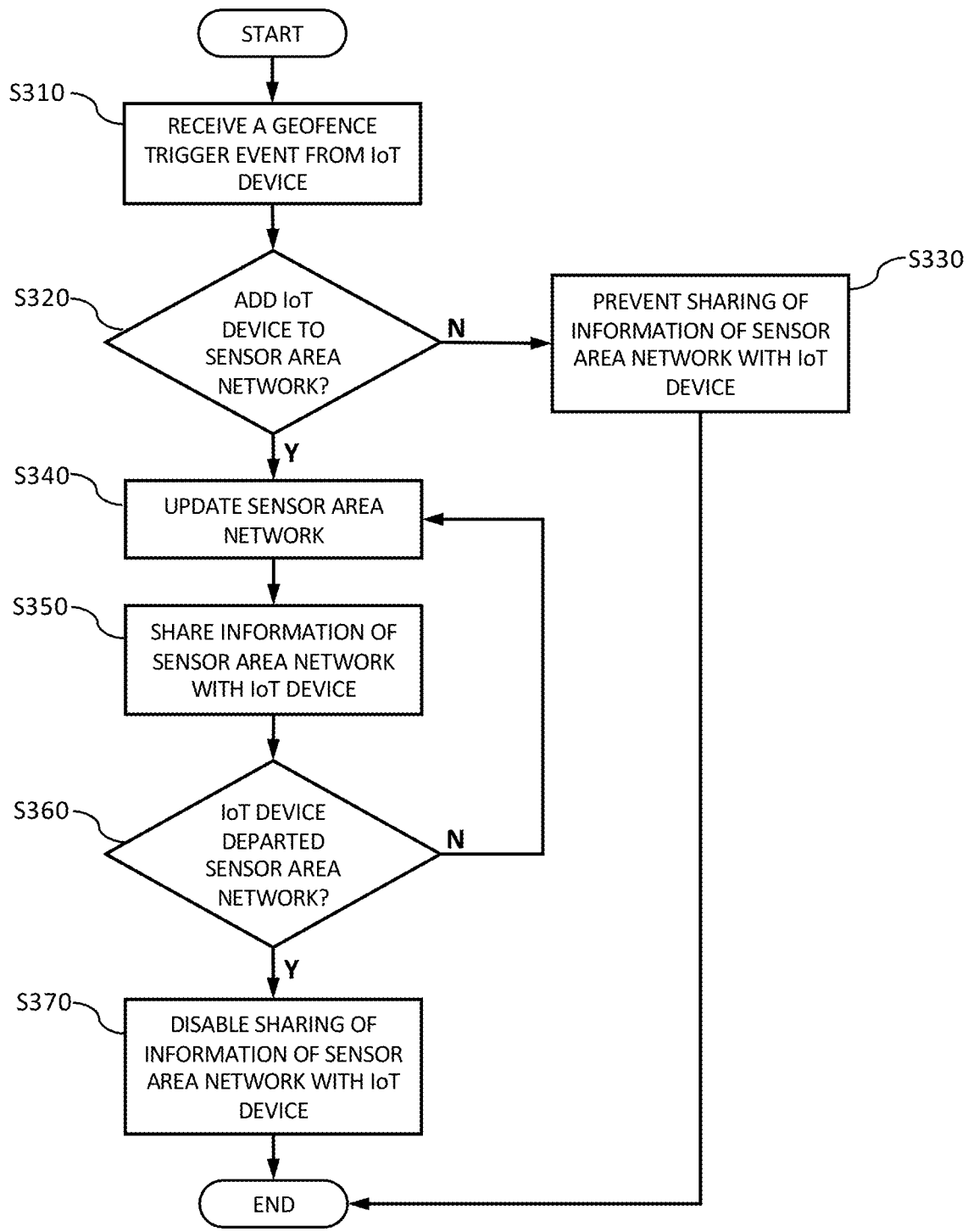
FIG. 3 is a flowchart illustrating the operations of the SAN manager of FIG. 1, in accordance with an embodiment of the invention.

FIG. 3 shows a flowchart illustrating the operations of sensor area network (SAN) manager 152 in accordance with an example embodiment of the invention. Referring to step S310, SAN manager 152 receives an alert to a geofence trigger event caused by an IoT device (e.g., IoT device 120, IoT device 130). In an example embodiment, SAN manager 152 receives an alert to an entry event triggered as a result of IoT device 120 entering the radius of the geofenced area in which SAN manger 152 is managing an existing geofenced sensor area network. In an example embodiment, the existing sensor area network being managed by SAN manager 152 includes IoT device 130. Additionally, in embodiments of the invention, SAN manager 152 may perform a context evaluation to identify which IoT devices/sensors are creating a sensor area network. The context evaluation may at least include a determination by SAN manager 152 of the type and/or capability of each IoT device/sensor creating the sensor area.

Referring to step S320, SAN manager 152 determines whether or not to add the identified IoT device to the existing sensor area network within the geofenced area. In an example embodiment, every time an IoT device (e.g., IoT device 120) causes a geofence trigger event by entering by entering the geofenced area, a plurality of security actions will be executed to determine the addition of the IoT device to the sensor area network or the rejection of the IoT device by the sensor area network. The execution of the security actions ensures that the subsequent sharing of information within the sensor area network will not happen with any rejected IoT device. In an example embodiment, security actions to determine the addition of a newly identified IoT device to the sensor area network include performing a handshake operation based on one or more of the following: device hardware characteristics (e.g., device ID, model manufacturer, serial #); device type or category (e.g., surveillance device, controlling device, monitoring device, etc); device outputs (e.g., data type, data content, etc); device features and capabilities based on sensors of the device; a private key preloaded on the device; and/or device signature comparison to previously authorized devices or member devices. In an example embodiment, SAN manager 152 determines to add IoT device 120 to the sensor area network as a result of a successful handshake operation being performed between SAN manager 152 and IoT device 120.

Referring to step S330, had SAN manager 152 determined in step S320 not to add IoT device 120 to the sensor area network, SAN manager 152 would prevent the sharing of information and/or resources of member devices of the sensor area network, such as IoT device 130, with IoT device 120. To prevent the sharing of information and/or resources of member devices of the sensor area network outside of the sensor area network, SAN manager 152 may, in response to determining not to add an IoT device to the sensor area network, limit such sharing to member devices only despite there being the presence the non-member (i.e., not added) IoT device within the geofenced area. In embodiments of the invention, SAN manager 152 may determine not to add IoT device 120, despite its presence within the geofenced area, to the sensor area network in response to an unsuccessful handshake operation between SAN manager 152 and IoT device 120.

Referring to step S340, in an example embodiment, in response to determining to add IoT device 120 to the sensor area network, SAN manager 152 updates the sensor area network with information of IoT device 120. In embodiments of the invention, SAN manager 152 may also update a status of a member IoT device of the sensor area network based on determining whether or not the IoT device is present within the sensor area network. In embodiments of the invention, SAN manager 152 may maintain a present member ID list. The present member ID list could also contain attributes/capabilities associated with each listed member IoT device and reflect whether or not listed member devices are present within a sensor area network. In some embodiments, the present member ID list may also contain a handshake verification/history for the listed member IoT devices. In such embodiments, if a listed member IoT device is no longer present within a geofenced sensor area network but a handshake verification/history (e.g., exchanged private keys) for the member IoT device is present in the present member ID list, then SAN manager 152 may not require a future handshake upon rejoining of the sensor area network by the member IoT device. In other embodiments, when a member IoT device leaves a sensor area network, SAN manager 152 may remove that device from the present member ID list and treat the device like a new IoT device upon any subsequent rejoining of the sensor area network. In embodiments of the invention, updating the sensor area network with information of IoT device 120 may include editing the present member ID list to include information of IoT device 120. In embodiments of the invention, updating a status of a member IoT device of a sensor area network may include editing an entry for that device within a present member ID list for the sensor area network.

Referring to step S350, SAN manager 152 enables the automatic sharing of information and/or resources of member devices of the sensor area network with the added IoT device. In an example embodiment, SAN manger 152 enables the automatic sharing of information (e.g., data) between IoT device 130 (an already existing member of the sensor area network) and IoT device 120. Furthermore, in an example embodiment, SAN manager 152 enables the automatic sharing of resources (e.g., device to device power sharing with wireless power transfer, sharing of processing capability, memory sharing for computations) between IoT device 130 and IoT device 120.

Referring to step S360, SAN manager 152 determines whether or not an IoT device has departed the sensor area network. In an example embodiment, SAN manager 152 determines that IoT device 120 has departed the sensor area network in response to receiving an alert to an exit event triggered by IoT device 120 leaving the geofenced area. In an example embodiment, SAN manager 152 may receive, via network 110, alerts to entry and exit events from location services software utilized by IoT devices within the defined geofenced area. Such alerts may allow SAN manager 152 to know which devices are present and which resources are available. Moreover, SAN manager 152 may periodically check with location services utilized within the geofenced area to determine if member IoT devices of the sensor area network are present. In response to determining that a member IoT device has departed the sensor area network, SAN manager 152 proceeds to step S370. In response to determining that a member IoT device has not departed the sensor area network, SAN manager 152 proceeds to step S340.

Referring to step S370, in response to determining that the IoT device has departed the sensor area network, SAN manager 152 disables the sharing of information and/or resources of member devices of the sensor area network with the IoT device. In an example embodiment, in response to determining that IoT device 120 has departed the sensor area network, SAN manager 152 disables the sharing of information between IoT device 130 and IoT device 120.

Figure 4:
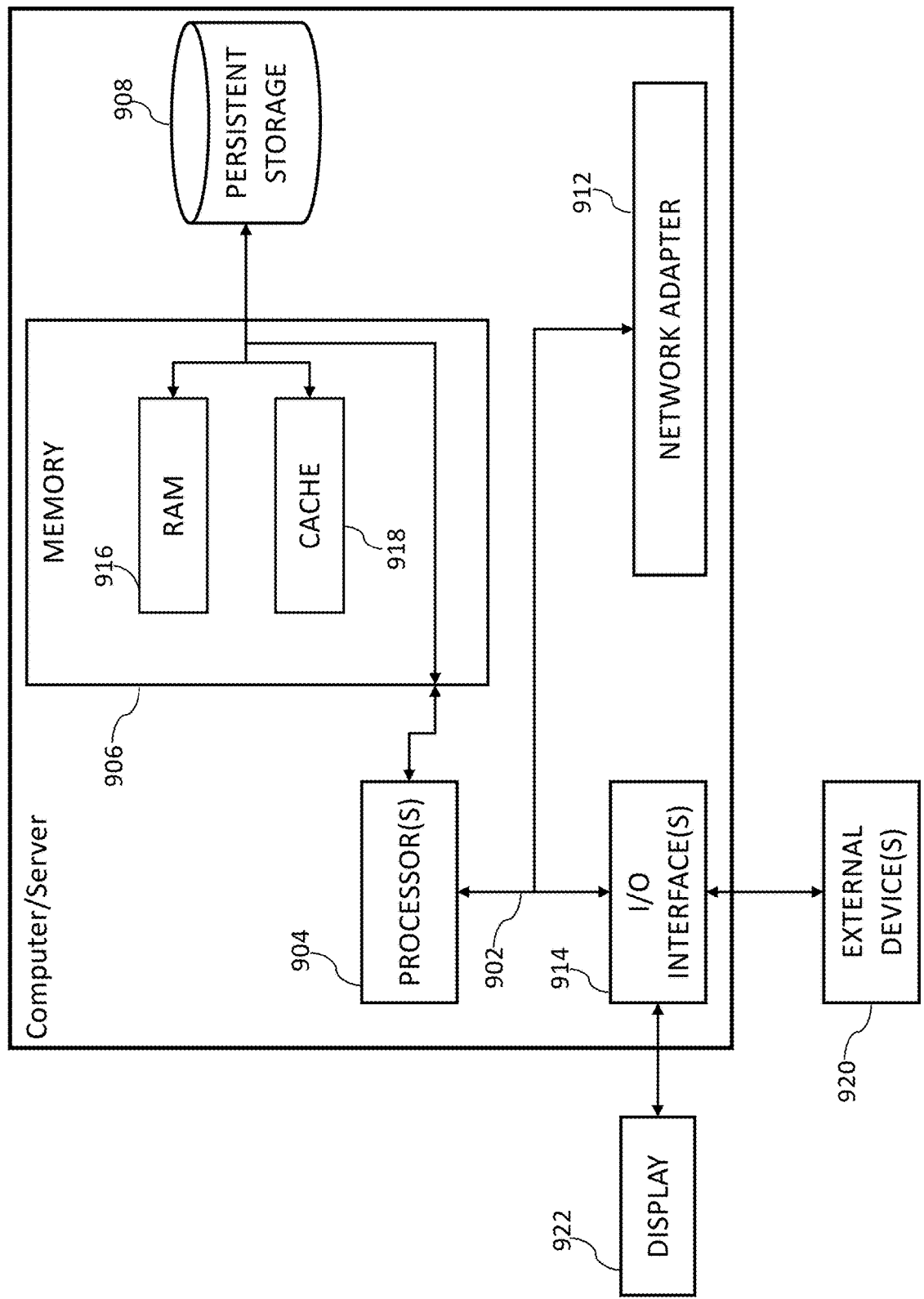
FIG. 4 is a block diagram depicting the hardware components of the IoT environment of FIG. 1, in accordance with an embodiment of the invention.

FIG. 4 depicts a block diagram of components of IoT gateway 140 and server 150, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

IoT gateway 140 and server 150 include communications fabric 902, which provides communications between computer processor(s) 904, memory 906, persistent storage 908, network adapter 912, and input/output (I/O) interface(s) 914. Communications fabric 902 can be implemented with any architecture designed for passing data and/or control information between processors (such as microprocessors, communications and network processors, etc.), system memory, peripheral devices, and any other hardware components within a system. For example, communications fabric 902 can be implemented with one or more buses.

Memory 906 and persistent storage 908 are computer-readable storage media. In this embodiment, memory 906 includes random access memory (RAM) 916 and cache memory 918. In general, memory 906 can include any suitable volatile or non-volatile computer-readable storage media.

The programs software module 142 in IoT gateway 140; and SAN manager 152 in server 150 are stored in persistent storage 908 for execution by one or more of the respective computer processor(s) 904 via one or more memories of memory 906. In this embodiment, persistent storage 908 includes a magnetic hard disk drive. Alternatively, or in addition to a magnetic hard disk drive, persistent storage 908 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 908 may also be removable. For example, a removable hard drive may be used for persistent storage 908. Other examples include optical and magnetic disks, thumb drives, and smart cards that are inserted into a drive for transfer onto another computer-readable storage medium that is also part of persistent storage 908.

Network adapter 912, in these examples, provides for communications with other data processing systems or devices. In these examples, network adapter 912 includes one or more network interface cards. Network adapter 912 may provide communications through the use of either or both physical and wireless communications links. The programs software module 142 in IoT gateway 140; and SAN manager 152 in server 150 may be downloaded to persistent storage 908 through network adapter 912.

I/O interface(s) 914 allows for input and output of data with other devices that may be connected to IoT gateway 140 and server 150. For example, I/O interface 914 may provide a connection to external devices 920 such as a keyboard, keypad, a touch screen, and/or some other suitable input device. External devices 920 can also include portable computer-readable storage media such as, for example, thumb drives, portable optical or magnetic disks, and memory cards. Software and data used to practice embodiments of the present invention, e.g., programs software module 142 in IoT gateway 140; and SAN manager 152 in server 150, can be stored on such portable computer-readable storage media and can be loaded onto persistent storage 908 via I/O interface(s) 914. I/O interface(s) 914 can also connect to a display 922.

Display 922 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While steps of the disclosed method and components of the disclosed systems and environments have been sequentially or serially identified using numbers and letters, such numbering or lettering is not an indication that such steps must be performed in the order recited and is merely provided to facilitate clear referencing of the method's steps. Furthermore, steps of the method may be performed in parallel to perform their described functionality.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 4, illustrative cloud computing environment 50 is depicted. As shown, cloud computing environment 50 includes one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 100 and cloud computing environment 50 can communicate with any type of computerized device over any type of network and/or network addressable connection (e.g., using a web browser).

Figure 5:
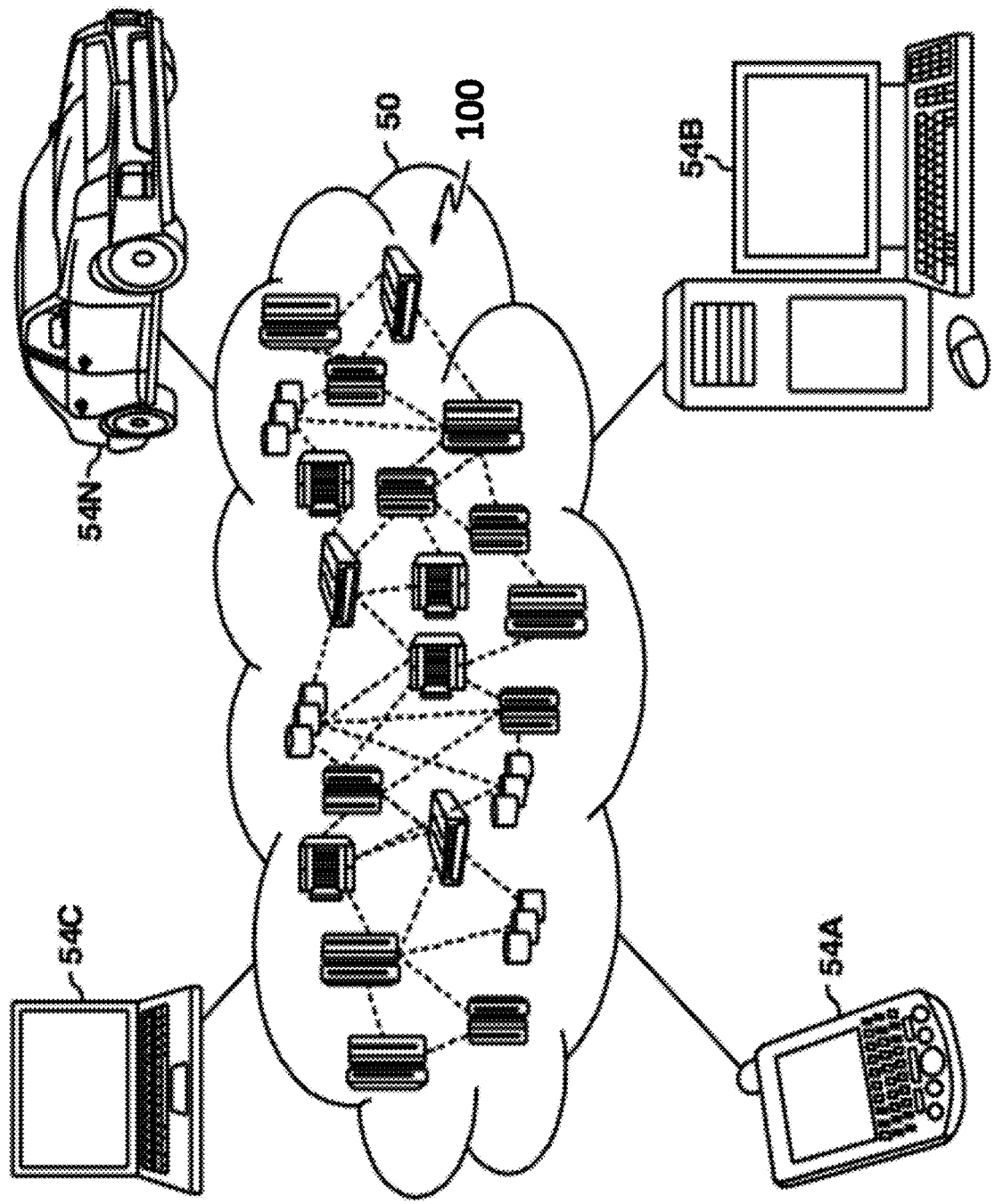
FIG. 5 depicts a cloud computing environment in accordance with an embodiment of the present invention.
Figure 6:
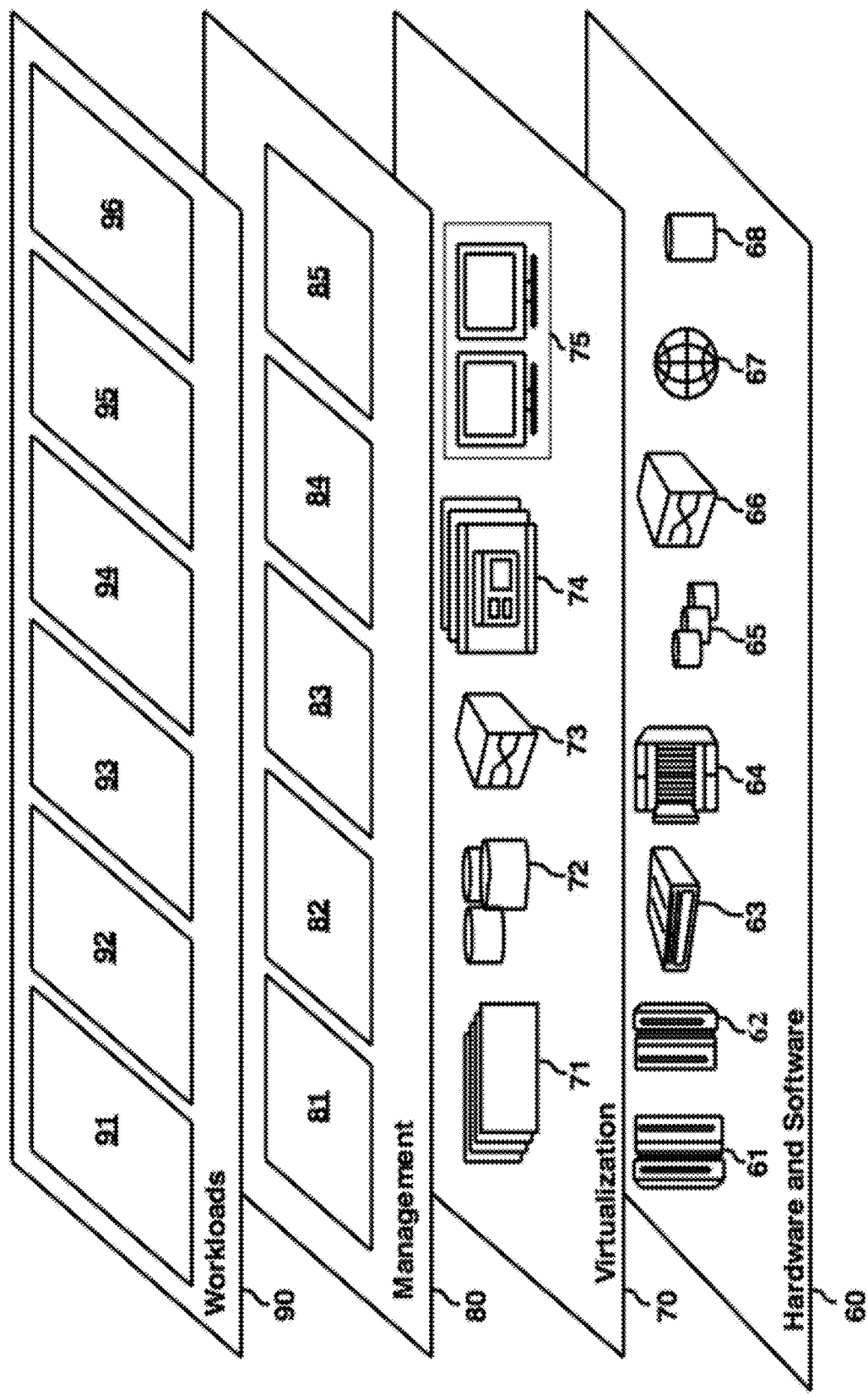
FIG. 6 depicts abstraction model layers in accordance with an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and IoT environment 96. IoT environment 96 may relate to the creation of a sensor area network using geofencing techniques applied to a given set of IoT devices to identify the members of the sensor area network and then enabling the sharing of information or resources (sensors, power, etc) between the geofenced devices.

The descriptions of the various embodiments of the present invention have been presented for purposes of illustration, but are not intended to be exhaustive or limited to the embodiments disclosed. The terminology used herein was chosen to explain the principles of the one or more embodiments, the practical application or technical improvement over technologies found in the marketplace, or to enable others of ordinary skill in the art to understand the embodiments. Various modifications, additions, substitutions, and the like will be apparent to those of ordinary skill in the art without departing from the scope and spirit of the invention, as defined in the following claims.

What is claimed is:

1. A computer-implemented method for managing a sensor area network, the computer-implemented method comprising:
in response to receiving a geofence trigger event from an Internet of Things (IoT) device, determining whether to add the IoT device to a sensor area network of IoT devices within a geofenced area based on a validation technique, wherein the validation technique comprises performing a handshake operation based on a private key preloaded on the IoT device and a comparison of a signature of the IoT device to previously authorized member devices;
in response to determining to add the IoT device, updating the sensor area network with information associated with the IoT device;
enabling sharing of information within the sensor area network between member devices of the sensor area network and the IoT device;
determining that the IoT device has departed the sensor area network; and
disabling the sharing of information within the sensor area network between the member devices of the sensor area network and the IoT device.

2. The computer-implemented method of claim 1, further comprising:
in response to determining to not add the Internet of Things device, limiting the sharing of information within the sensor area network to among the member devices only.

3. The computer-implemented method of claim 1, further comprising:
in response to a determination to add the Internet of Things device, enabling sharing of resources within the sensor area network between member devices of the sensor area network and the Internet of Things device.

4. The computer-implemented method of claim 1, wherein the handshake operation is further based on at least one of a device hardware characteristic, a device type or category, a device output, and/or a device feature or capability.

5. The computer-implemented method of claim 1, wherein the trigger event occurs in response to the Internet of Things device entering the geofenced area.

6. The computer-implemented method of claim 1, wherein the sensor area network is automatically created based on a contextual need.

7. A computer program product for managing a sensor area network, the computer program product comprising:
one or more computer-readable tangible storage devices and program instructions stored on at least one of the one or more computer-readable tangible storage devices, wherein the program instructions are executable by a computer, the program instructions comprising:
in response to receiving a geofence trigger event from an Internet of Things (IoT) device, program instructions to determine whether to add the IoT device to a sensor area network of IoT devices within a geofenced area based on a validation technique, wherein the validation technique comprises performing a handshake operation based on a private key preloaded on the IoT device and a comparison of a signature of the IoT device to previously authorized member devices;
in response to determining to add the IoT device, program instructions to update the sensor area network with information associated with the IoT device;
program instructions to enable sharing of information within the sensor area network between member devices of the sensor area network and the IoT device;
program instructions to determine that the IoT device has departed the sensor area network; and
program instructions to disable the sharing of information within the sensor area network between the member devices of the sensor area network and the IoT device.

8. The computer program product of claim 7, further comprising:
in response to determining to not add the Internet of Things device, program instructions to limit the sharing of information within the sensor area network to among the member devices only.

9. The computer program product of claim 7, further comprising:
in response to the determination to add the Internet of Things device, program instructions to enable sharing of resources within the sensor area network between member devices of the sensor area network and the Internet of Things device.

10. The computer program product of claim 7, wherein the handshake operation is further based on at least one of a device hardware characteristic, a device type or category, a device output, and/or a device feature or capability.

11. The computer program product of claim 7, wherein the trigger event occurs in response to the Internet of Things device entering the geofenced area.

12. The computer program product of claim 7, wherein the sensor area network is automatically created based on a contextual need.

13. A computer system for managing a sensor area network, the computer system comprising:
one or more processors, one or more computer-readable memories, one or more computer-readable tangible storage devices, and program instructions stored on at least one of the one or more computer-readable tangible storage devices for execution by at least one of the one or more processors via at least one of the one or more memories, the program instructions comprising:
in response to receiving a geofence trigger event from an Internet of Things (IoT) device, program instructions to determine whether to add the IoT device to a sensor area network of IoT devices within a geofenced area based on a validation technique, wherein the validation technique comprises performing a handshake operation based on a private key preloaded on the IoT device and a comparison of a signature of the IoT device to previously authorized member devices;
in response to determining to add the IoT device, program instructions to update the sensor area network with information associated with the IoT device;
program instructions to enable sharing of information within the sensor area network between member devices of the sensor area network and the IoT device;
program instructions to determine that the IoT device has departed the sensor area network; and program instructions to disable the sharing of information within the sensor area network between the member devices of the sensor area network and the IoT device.

14. The computer system of claim 13, further comprising: in response to determining to not add the Internet of Things device, program instructions to limit the sharing of information within the sensor area network to among the member devices only.

15. The computer system of claim 13, further comprising: in response to the determination to add the Internet of Things device, program instructions to enable sharing of resources within the sensor area network between member devices of the sensor area network and the Internet of Things device.

16. The computer system of claim 13, wherein the handshake operation is further based on at least one of a device hardware characteristic, a device type or category, a device output, and/or a device feature or capability.

17. The computer system of claim 13, wherein the trigger event occurs in response to the Internet of Things device entering the geofenced area.

* * * * *